July 30, 1957  G. E. WATTS ET AL  2,800,701
PRODUCTION OF POWER TRANSMISSION AND CONVEYOR BELTING
Filed Jan. 18, 1955  3 Sheets-Sheet 1
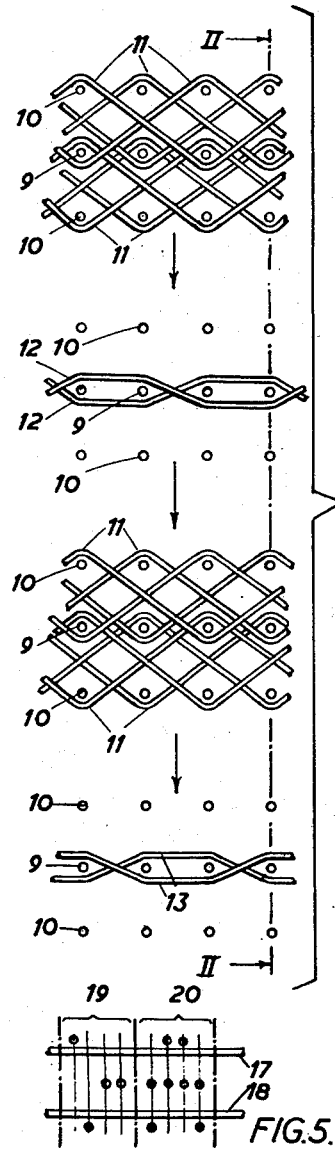
FIG. 1.
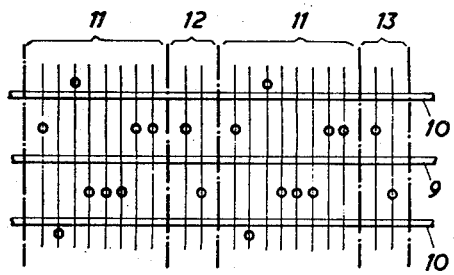
FIG. 2.
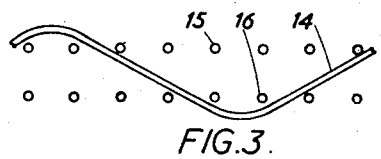
FIG. 3.
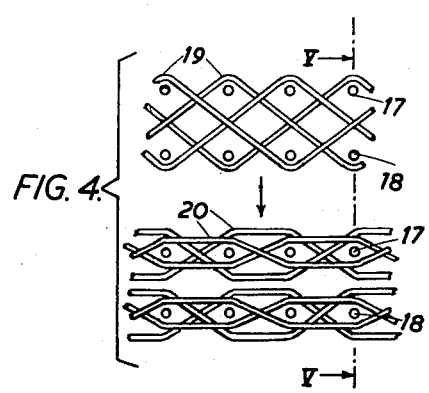
FIG. 4.
FIG. 5.
Inventors
GILBERT ERNEST WATTS
SIDNEY BEETHAM HAINSWORTH
HUGH JOSEPH PERRY
By Mead, Browne, Schuyler & Beveridge
Attorneys July 30, 1957 G. E. WATTS ET AL 2,800,701
PRODUCTION OF POWER TRANSMISSION AND CONVEYOR BELTING
Filed Jan. 18, 1955 3 Sheets-Sheet 2

Inventor—
GILBERT ERNEST WATTS
SIDNEY BEETHAM HAINSWORTH
HUGH JOSEPH PERRY
By
Mead, Browne, Schuyler & Beveridge
Attorneys

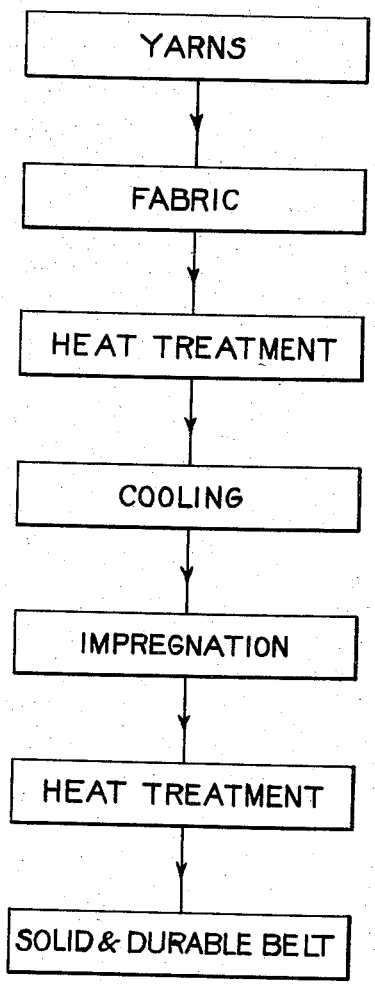

United States Patent Office 2,800,701
Patented July 30, 1957

2,800,701

PRODUCTION OF POWER TRANSMISSION AND CONVEYOR BELTING

Gilbert Ernest Watts, Hull, Sidney Beetham Hainsworth, Elloughton, near Brough, and Hugh Joseph Perry, Hull, England, assignors to J. H. Fenner & Co. Limited, Hull, England Application January 18, 1955, Serial No. 482,632

Claims priority, application Great Britain January 20, 1954

8 Claims. (Cl. 28—80)

The present invention relates to improvements in and methods of producing power transmission and conveyor belting of the type in which a multiple ply textile fabric is impregnated with an impregnant.

Power transmission and conveyor belting must have a relatively dense and solid structure, otherwise it will distort when under usage strain and be unsatisfactory generally. Therefore, it has been customary hitherto for power transmission and conveyor belting to include relatively tightly woven textile fabrics and such power transmission and conveyor beltings have depended upon their woven structure for the greater part of their belting characteristics. Such belting will be referred to hereinafter as "conventional belting."

The contribution to power capacity, dimensional stability and, particular, fastener holding by the conventional impregnants hitherto employed in connection with such conventional belting has been relatively small. Using conventional impregnants such as rubber latex the degree of penetration is limited unless special precautions are taken to ensure the provision of indents in the exposed surfaces of the outer plies of the multiple ply textile fabric. Even in these circumstances intimate penetration by rubber latex into the interior of the textile fabric has been localised only. Hitherto the overriding consideration in any multiple ply textile fabric intended for use in power transmission and conveyor belting has been the tightness of the woven structure. Apart from the limited penetrating achieved when using conventional impregnants such as rubber latex, the techniques involved are relatively laborious and complex.

With a view to traversing these known and long recognised limitations in conventional power transmission and conveyor belting of the type hereinbefore defined and in an attempt to ensure deep and intimate penetration of impregnant within the interior of the woven fabric core it is known that one can treat fibres or yarns with a liquid suspension or dispersion of an ungelled polyvinyl compound such as polyvinyl chloride and a plasticiser and, after incorporating such treated yarns or fibres in a fabric, subjecting the fabric to heat treatment to gel the polyvinyl compound. This results in some increase in the impregnant content of the resulting belting but the degree of adhesion between yarns or fibres in the interior of the fabric core still appears somewhat limited and the amount of woven structure per unit volume of belting still greatly outweighs the amount of impregnant present.

An object of the present invention is to provide a method for producing a multiple ply power transmission and conveyor belting in which the impregnant content of the belting bears such a relationship to the woven structure of the belting as to make a significant contribution to the belting characteristics.

A further object of the invention is to provide a method for producing power transmission and conveyor belting using multiple ply textile fabrics of conventional weave or otherwise which, contrary to established teaching, may be woven so loosely as to be totally unsuited for use as belting per se and which give indifferent or even unsatisfactory results when impregnated by the techniques normally employed for applying conventional impregnants under ordinary atmospheric conditions but which may be employed with wholly satisfactory results when treated in accordance with the present invention.

Yet a further object of the invention is to provide power transmission and conveyor belting in which the interstices of the multiple ply textile fabric embodied therein are completely or substantially completely filled with impregnant.

According to the present invention a method of producing a multiple ply solid woven power transmission and conveyor belting embodying a multiple ply textile fabric core comprises the steps of weaving a fabric so loosely as to be wholly unsuited for belting duties per se, subjecting said dried and cooled woven fabric to impregnation under atmospheric pressure with a liquid suspension or dispersion of an ungelled polyvinyl compound together with a plasticiser and thereafter imparting solidity to said impregnated fabric by subjecting it to heat treatment in order to gel the polyvinyl compound present.

This method of producing power transmission and conveyor belting is such that the multiple ply textile fabric constituting the core of the belting takes up between 75–150% of its own weight of polyvinyl compound without any significant increase in belt thickness and without any shrinkage in the volume of impregnant present in the interstices of the woven fabric during the heat treatment to effect gelling.

The invention includes a power transmission or conveyor belt comprising a multiple ply solid woven textile fabric impregnated with a polyvinyl compound in which the weight of impregnant per unit volume of textile fabric constituting the core of the belting lies between 75% and 150%.

For practical purposes, an impregnant take-up of between 80% and 100% per unit volume of textile fabric is preferred, providing a solid and durable structure.

The liquid suspension or dispersion of the polyvinyl compound may be applied to the multiple ply textile fabric by any of the conventional means, such as dipping, spraying, painting or calendering. However, by reason of the ease and speed of penetration of the polyvinyl compound, simple dipping is preferred. Preferably the polyvinyl compound consists of polyvinyl chloride. A particularly useful method is the dipping or spreading process using polyvinyl chloride powder which has been ground with a plasticiser such as tricresyl phosphate to produce a paste. Whilst the proportions of polyvinyl chloride powder to plasticiser can vary over a wide range such as 40:60 to 60:40 and still give practical results the optimum ratio for dipping purposes, depending upon the particular belting construction, dipping temperature and grade and type of plasticiser, lies between 45:55 and 50:50. If approximately equal proportions of polyvinyl chloride powder and plasticiser are employed a fairly fluid dispersion is obtained which is particularly well suited for treating the multiple ply textile fabric by the dipping technique.

The selection of a polyvinyl compound and more particularly polyvinyl chloride as the impregnant for a multiple ply textile fabric thus presents the outstanding advantage that a multiple ply textile fabric which is woven so slackly and so loosely as to be limp in the untreated state and which as such would be unsuited for use as a power transmission or conveyor belt per se and even after impregnation with conventional impregnants under ordinary atmospheric conditions, may in accordance with the present invention be converted into a solid and durable structure which is fully suited to serve as a power transmission belt and conveyor belt. This striking achievement is possible because of the apparent ease and rapidity of penetration of the polyvinyl chloride, despite its relatively high viscosity, into the interior of the woven structure coupled with the ability of said polyvinyl compound to completely fill the interstices of the woven structure after gelling. The salient feature of using polyvinyl chloride as impregnant for a woven structure is that it does not change in volume when gelled from liquid to solid phase. The whole of the liquid component remains in the plastic mass and thus the interstices of the woven structure remain completely filled.

The ability of the polyvinyl compound to fill completely the interstices of the woven fabric without significant contraction in volume on gelling thus provides great latitude in the choice of weave patterns which may usefully be employed in the production of power transmission and conveyor beltings and in the tightness to which such weave patterns need conform.

Some weave patterns which may readily be employed will now be considered in greater detail, special attention being paid to a novel multiple ply textile fabric developed for use in connection with this invention.

With filament rayon yarns in solid woven belting structures there is a marked tendency to fatigue in use due to belt flexing, this tendency being very pronounced if the rayon yarns are in a plain weave arrangement, and to overcome this a large amount of twist must be incorporated in the yarn. The use of this large amount of twist is objectionable as it involves expense to insert, reduces the yarn strength and produces a harder yarn which does not bed down so well in a solid woven structure. This latter feature renders it difficult to produce a compact structure, reduces fabric strength and can be the cause of internal belt chafing, where such yarns cross each other or cross other yarns.

Accordingly, a multiple ply textile fabric especially suited for use in connection with the present invention is one in which each of the weft threads of said multiple ply textile fabric is bound by a set of warp threads, hereafter referred to as binding-and-weaving warp threads, each of which passes over or under a weft thread in one ply and in a first column of said weft threads and under or over a weft thread in an adjacent ply and in a second column of said weft threads, said second column of weft threads being separated by at least one intermediate column of weft threads from the first column of weft threads. By "column of weft threads" is meant any series of weft threads which, though each disposed in separate plies, are superimposed above each other in substantially the same vertical plane. Such a multiple ply textile fabric may conveniently consist of two plies, the weft threads in any one column of weft threads in said fabric being bound by sets of four of said binding-and-weaving warp threads.

Again, the multiple ply textile fabric may consist of three plies, the weft threads in any one column of weft threads in said fabric being bound by sets of eight of said binding-and-weaving warp threads.

A multiple ply textile fabric consisting of any number of plies greater than three, for example, four or five plies, and in which the weft threads in any one column of weft threads in said fabric are bound by sets of said binding-and-weaving warp threads may equally well be employed.

In a preferred form of this class of fabric the sets of binding-and-weaving warp threads of the textile fabric are separated from one another by sets of reinforcement warp threads, each said set of reinforcement threads being disposed wholly within one ply of said multiple ply textile fabric and passing alternately over and under successive groups of weft threads in said ply. The groups may, for instance, be pairs of weft threads.

In the case of a two ply textile fabric the reinforcement threads may be disposed in oppositely woven pairs in each ply. In the case of a three ply textile fabric it is preferred to dispose the reinforcement threads in oppositely woven pairs in the intermediate ply only.

Each of the weft threads of a multiple ply textile fabric of this type may be bound by binding-and-weaving warp threads, each of which passes over a first group of two or more successive weft threads in one ply of said textile fabric and under a second group of two or more successive weft threads respectively in an adjacent ply of said textile fabric, the columns of weft threads in which said first and second groups of two or more weft threads lie, being separated from one another by at least one group of one or more successive columns of weft threads, respectively.

Multiple ply textile fabrics of this particular class will now be further described with reference to the accompanying drawings because this particular class provides an outstanding example of fabrics which can be impregnated with polyvinyl compound successfully, said impregnant readily penetrating to the centre ply, completely filling the interstices of the belt and rendering unnecessary any elaborate treatment to secure a thorough permeation by the plastic mass.

Fig. 1 is an exploded section of a preferred three ply textile fabric especially suitable for impregnation according to the invention, Fig. 2 is a section taken along the line II—II of Fig. 1, Fig. 3 illustrates an alternative path for the binding-and-weaving warp threads shown in Fig. 1, Fig. 4 is an exploded section of a two ply textile fabric suitable for impregnation according to the invention, and, Fig. 5 is a section taken along the line V—V of Fig. 4.

Referring firstly to Figs. 1 and 2, the weft threads 9 of an intermediate ply and the weft threads 10 of outer plies are bound in column by sets of eight binding-and-weaving rayon warp threads 11, each of which passes over a first weft thread in one ply and under a second weft thread in the adjacent ply, the columns of weft threads containing the first and second weft threads being separated from one another by an intermediate column of weft threads. The sets of binding-and-weaving warp threads are separated by sets of reinforcing rayon warp threads 12 and 13, each of which passes alternately over and under pairs of the intermediate weft threads 9. As will be readily seen from Fig. 2 the set of threads 11 is succeeded by a set of threads 12 in turn succeeded by a further set of threads 11, succeeded by a set of threads 13. This pattern may be repeated as often as desired.

In Fig. 3 the weaving path of a warp thread 14 embodying features of the weaving paths of threads 11 and 12, is shown with respect to two plies consisting of weft threads 15 and 16. The thread 14 passes over one pair of threads 15, between two pairs of threads 15 and 16 and under a pair of threads 16, finally passing between two pairs of threads 15 and 16 before repeating the pattern.

Binding-and-weaving warp threads 19 bind together the weft threads 17 and 18 of adjacent plies shown in Fig. 4 in a manner analogous to the binding of the weft threads 9 and 10 by the threads 11 in Fig. 1. The sets of warp threads 19 alternate as shown in Fig. 5 with sets of reinforcing threads 20 each of which passes over a pair of weft threads 17 or 18 and under a succeeding pair of weft threads of the same ply.

It will be noted that in the constructions described above the warp threads 11, 12, 13, 14, 19 and 20 are woven in a pattern involving undulations which are less severe than if a plain weave had been used, while the threads 11 and 19 possess the dual function of binding threads and normal warp threads. By dispensing with plain woven warp threads greater fabric strength is obtained, the degree of fatiguing of the warp threads is reduced and less twist can consequently be employed.

In the fabric described in Figs. 1 and 2 of the drawings, the intermediate ply is more tightly packed with warp yarn than are the two outer plies. Due to the extra yarns 12 and 13 in the intermediate ply being positioned between the sets of yarns 11 forming the outer plies and so holding these latter yarns in spaced relationship to one another, the outer plies are of relatively open structure, thus readily permitting impregnation of the fabric. Because the weft threads 9 in the intermediate ply have been drawn together in pairs by warp yarns 12 and then split and drawn together into other pairs by warp yarn 13, a degree of openness is achieved in the intermediate ply which allows of permeation by the impregnating material.

For a power transmission or conveyor belt to be satisfactory it must possess among other qualities an adequate tensile strength, a high measure of fastener holding, flexibility, an adequate modulus of elongation, and resistance to length variation due to atmospheric humidity or actual contact with water. It is a consequence of the relatively low degree of twist in the filament rayon warp yarns that a lower number of thicker yarns may be used while retaining a high breaking strength. This ensures that the belt has adequate strength and yet allows a relatively coarse and open structure to be woven, so assisting in the plastic penetration. If such a high degree of strength is not required, other, and weaker, yarns may be substituted for the rayon yarn, such as cotton or hair yarns.

The packing of the intermediate ply with warp yarns as compared with the outer plies ensures a good, stable foundation for the belt construction and combined with the bedding effect obtained by the use of softly twisted yarns, and the complete solidarity resulting from thorough permeation by the impregnating plastic mass, this packing ensures a high measure of fastener holding. The high measure of fastener holding is further facilitated by the aforementioned grouping together of the weft threads of the intermediate ply into pairs by means of threads 12, and then splitting these pairs into other pairs by means of threads 13 so linking the weft yarns of the intermediate ply and securely binding them against pulling out due to fastener strain.

Unusual flexibility is achieved in a belt possessing the textile structure described in Figs. 1 and 2 by having the densest woven portion in the intermediate ply, this being the neutral region which has neither to expand nor contract when the belt is passing over pulleys, and by having all the warp yarns of the outer plies passing into this neutral region at short, regular intervals. Thus no warp yarn is completely disposed in the outer ply above the intermediate ply wherein it would be stretched unduly in passing around pulleys, necessarily making the belt less flexible by resisting this stretching effect, and again no warp yarn is completely disposed in the outer ply below the intermediate ply wherein it would have to accommodate a high measure of compression lengthwise, when flexed around a pulley. Since the paths of the warp yarns 11 are generally diagonal to the direction of belt length, lengthwise temporary stretching or compression of a portion of the belt components is easily achieved, with the affected warp yarns merely assuming a slightly more drawn up formation.

The use of binding-and-weaving warp threads in the production of multiple ply textile fabrics generally results in structures with a relatively low modulus of elongation, which is undesirable in most belting applications. This is overcome in the construction of Figs. 1 and 2 by disposing the warp yarns 12 and 13 in the intermediate ply and also by virtue of the fact that this relatively slackly woven structure is readily permeated by the plastic paste, the internal structure is thereby lubricated and can then easily be stretched to any desired practical degree, without the use of any heavy or powerful equipment. When the impregnating plastic mass is gelled or vulcanised it can still prevent the belt from retracting, thus removing any tendency subsequently to stretch easily under load. A further important advantage is that by this thorough permeation of a relatively open structure, and stretching this whilst the plastic mass is still in the fluid or plastic state, a well consolidated product results in which the various components are firmly bonded together and by the use of a controlled stretching technique, uniform beltings can be produced of any desired practical modulus of elongation.

However, as indicated previously, the present invention is not restricted to any particular weave pattern and by way of illustration of the scope of the present invention a number of weaves of conventional design are appended which may be utilised in accordance with the present invention. For the sake of clarity some of the normal warp yarns have been omitted, emphasis being mainly directed to the binder systems illustrated.

Fig. 6 illustrates a binder system essentially similar to that described in Figs. 1 and 2, except that extra yarns are included in the centre ply as a plain weave. The possibility of using non-rayon warp yarn is envisaged. Deep penetration of the polyvinyl compound is possible.

Fig. 9 is a flow chart showing process steps for producing a power transmission and conveyor belt according to the invention.

Figure 6:
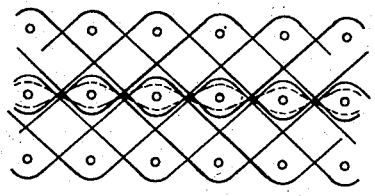

Impregnation of a multiple ply textile fabric in accordance with the invention will now be more particularly described by reference to the impregnation of the preferred woven fabric illustrated in Figs. 1 and 2.

A dispersion is prepared consisting of 45% by weight of polyvinyl chloride powder intimately ground with 55% by weight of tricresyl phosphate, together with a small amount of stabiliser and a minor quantity of colouring matter.

The fabric woven in accordance with Figs. 1 and 2 and in a dried and cooled state is passed through a trough filled with the dispersion and maintained at atmospheric temperature and pressure. The fabric is both squeezed and agitated whilst immersed beneath the surface of the dispersion in order to remove air disposed within the interstices of the woven fabric. A dipping time of between 1 and 3 minutes is normally sufficient to ensure substantially complete penetration for this specific example of open weave fabric and this particular concentration of polyvinyl chloride dispersion.

As the impregnated fabric emerges from the trough, it is run through nip rollers or between scraper blades which are adjusted relative to one another so as to remove dispersion adhering to the surface of the fabric.

The adjustment of the nip rollers or scraper blades can be used to determine the thickness of any surface coating it is desired to impart to the impregnated fabric. Alternatively, if an increased thickness or another type of coating is required, the impregnated belt may be passed through a second trough filled with a dispersion conforming to different proportions of polyvinyl chloride and plasticiser.

The impregnated fabric, with or without an additional sheathing coat, is finally passed into and through a gelling tunnel usually maintained at a temperature of 250–280° C., the object being to ensure that the temperature of the impregnated belting shall quickly reach 150–160° C., at which temperature gelling takes place almost instantaneously.

As an alternative to squeezing and agitating the woven fabric whilst beneath the surface of the dispersion, it can be squeezed between nip rollers immediately prior to dipping. These rollers may be half submerged in the dispersion and be associated with doctor blades at one stage in their revolution in order to ensure that dispersion is removed therefrom before the incoming woven fabric is squeezed between the nip rollers.

It is a factor of some considerable practical importance to ensure that as much air as possible is removed from the woven fabric before impregnation takes place, as the presence of air bubbles and air pockets within the gelled structure militates against the ultimate solidity of the belt.

Comparative data relating to the impregnation of a number of different fabrics of varying thickness and weave pattern by conventional impregnants such as rubber latex and bitumen and by a polyvinyl compound in accordance with the invention are set out in detail in the accompanying Tables 1–3.

Table 1 includes data relating to two belts A and B of conventional tight weave and to a belt C which, though woven tighter than the slackly woven belts detailed in Table 2, is not so tightly woven as belts A and B.

Table 2 includes data relating to four slackly woven belts D to G, of which D is a very thin belt with an open weave whereas G is a relatively thick but very slackly woven belt.

Table 3 includes details of the actual specification of five of the seven belts set down in Tables 1 and 2.

The viscosity of the 50% rubber latex and 45% polyvinyl chloride/tricresyl phosphate is as under:

|  | Poises |
|---|---|
| 50% rubber latex | [1] 3 |
| 45% polyvinyl chloride/tricresyl phosphate | [1] 15 |

[1] At 25° C.

The considerably greater viscosity of the polyvinyl chloride/tricresyl phosphate is thus apparent.

Some caution should be exercised in assessing the data presented above, in the sense that although comparable within the limits presented by differing face structures

TABLE 1

*Conventional beltings.—Laboratory results*

[Percentage impregnant take-up expressed on belting weight.]

| Identity | Belt thickness and weave characteristics | Immersion period | (a) Rubber latex 50% concentration; Vacuum and pressure | (b) Rubber latex 50% concentration; Atmospheric pressure | (c) Rubber latex 35% concentration; Vacuum and pressure | (d) Rubber latex 35% concentration; Atmospheric pressure | (e) P. V. C., 45% P. V. C./tricresyl phosphate dispersion; Vacuum and pressure | (f) P. V. C., 45% P. V. C./tricresyl phosphate dispersion; Atmospheric pressure | (g) Bitumen, 50% solution in petroleum solvent |
|---|---|---|---|---|---|---|---|---|---|
|  |  | Minutes | Percent | Percent | Percent | Percent | Percent | Percent | Percent |
| A | 4½ mm., 2 ply fabric as in Fig. 4 | 3 |  | 22 | 21 | 13 | 33 | 25 | 22 |
|  | 6½ mm. | 1 |  | 12 |  |  |  | 24 |  |
| B | Binder system as in Fig. 7, centre ply with plain weave yarn. Outer plies, 2 and 1 twill. | 3 |  | 20 |  |  |  | 27 | 23 |
|  | 7½ mm. | 1 |  | 15 |  |  |  | 36 |  |
| C | Binder system as in Fig. 6. Extra yarns in outer plies as plain weave. | 3 |  | 28 |  |  |  | 47 | 16 |

TABLE 2

*Slackly woven beltings.—Laboratory results*

[Percentage impregnant take-up expressed on belting weight.]

| Identity | Belt thickness and weave characteristics | Immersion period | (a) Rubber latex 50% concentration; Vacuum and pressure | (b) Rubber latex 50% concentration; Atmospheric pressure | (c) P. V. C., 45% P. V. C./tricresyl phosphate dispersion; Atmospheric pressure | (d) Bitumen, 50% solution in petroleum solvent |
|---|---|---|---|---|---|---|
|  |  | Minutes | Percent | Percent | Percent | Percent |
| D | 3½ mm. Binder system as in Fig. 6, Extra yarns in outer plies as plain weave. | 1 |  | 50 | 75 |  |
|  |  | 3 | 102 | 56 | 150 | 32 |
| E [1] | 5 mm. | 3 | 98 | 36 | 124 | 31 |
| F [1] | 6½ mm. | 1 |  | 18 | 55 |  |
|  |  | 3 | 60 | 34 | 76 | 26 |
| G | 8 mm., Figs. 1 and 2 | 1 |  | 65 | 114 |  |
|  |  | 3 |  | 70 | 125 | 16 |

Figure 7:
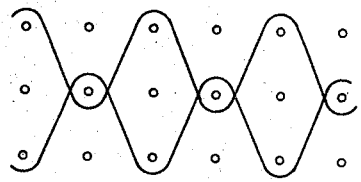
Fig. 7 illustrates a binder system separating layers of warp yarns in either plain or twill weave.
Figure 8:
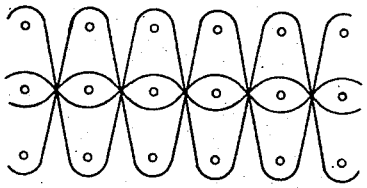
Fig. 8 illustrates a binder system in which binder threads pass through the belt from one outer ply to the other outer ply, extra warp yarns being provided in the centre ply.

[1] Binder system as in Fig. 7; center ply with plain weave yarn; outer plies, 2 and 1 twill.

TABLE 3

|  | Belt B | Belt C | Belt D | Belt F | Belt G |
|---|---|---|---|---|---|
| Weight per cubic foot | 55 lbs | 39 lbs | 24 lbs | 37 lbs | 30 lbs. |
| Total ends per inch warp-way | 290 | 96 | 96 | 160 | 60. |
| Warp-wise ends | 7 fold 12s cotton |  | 5 fold 12s cotton | 7 fold 12s cotton | 6 fold 1650 denier high tenacity filament rayon. |
| Total weft threads per inch | 30, i. e. 10 in each ply. | 24, i. e. 8 in each ply. | 31½, i. e. 10½ in each ply. | 24, i. e. 8 in each ply. | 15, i. e. 5 in each ply. |
| Weft yarn | 18 fold 9s cotton | 18 fold 9s cotton | 7 fold 12s cotton | 18 fold 9s cotton | 25 fold 9s cotton. |
| Binding and weaving yarns |  | 2 fold 1650 high tenacity filament rayon. |  |  |  |
| Plain weave threads (pile) |  | 7 fold 12s cotton |  |  |  | these results have been obtained experimentally on small sample lengths, and under such conditions it is recognised that higher impregnant take-up values are often obtained than are normal in full scale manufacture.

Subject to this reservation, however, as between the results of laboratory and full scale manufacture, the results clearly indicate a surprisingly high degree of penetration of polyvinyl chloride into the interstices of a loosely woven belt. It will be observed that in both belts A and B the take-up of impregnant, whether it be 50% rubber latex or 45% polyvinyl chloride/tricresyl phosphate is relatively small. It is fair to say that there is negligible penetration except of the interstices of outer plies. Cracks and crevices are filled up by the impregnant, but the effect is essentially a surface one. The application of vacuum and pressure introduced no significant difference in take-up due to the tightness of the weave. Only in the case of bitumen in petroleum solvent is there any real penetration. Belt C was not changed in stiffness to any degree. The effect was very much less than the take-up figures would suggest, yet this belt which had an absorbent "pile" face was rather too slackly woven to be used without some impregnation.

On the other hand, the four different belts illustrated in Table B show a very marked take-up of polyvinyl chloride impregnant ranging from as high as 150% in the case of belt D which is a 3½ mm. thick belt of low density and having an open weave, to 76% take-up in belt F woven 6½ mm. thick at a greater density having outer plies of 2 and 1 twill. The weave most favoured for impregnation in accordance with the invention, namely belt G, exhibits a very high take-up of polyvinyl chloride, despite the fact that it is 8 mm. thick. The low density of this particular belt will be noted from Table 3.

There is an appreciable take-up of 50% rubber latex in belt G, but this does not compare with the significantly higher take-up of polyvinyl chloride under comparable conditions, and this appreciable take-up of 50% rubber latex is largely due to the favourable weave design and constructional details of this particular belt. The resultant impregnated belt feels "hollow" as compared with the corresponding polyvinyl chloride impregnated belt. The low take-up for bitumen by belt G compared with belt F is probably due to the more open structure of the former allowing the fluid bitumen solution to drain away before drying.

The limited work done on comparing the relative degree of penetration of fine yarns and coarse yarns suggests that a slight advantage lies with the coarser yarns. A belt of the preferred weave illustrated in Figs. 1 and 2 was produced using 6 fold 1650 denier rayon yarn in the warp direction, and then with two threads of 3 fold yarn in direct replacement of this. The respective take-ups on treatment with 45% polyvinyl chloride/tricresyl phosphate are given below.

| Yarn: | Take-up, percent |
| --- | --- |
| 6 fold 1650 denier | 125 |
| 2 ends of 3 fold 1650 denier | 120 |

The effect of the time factor between impregnation of the woven fabric and the act of gelling has been investigated, but with inconclusive results. It is known that if yarn as opposed to the woven fabrics made from such yarn, is treated with polyvinyl chloride/tricresyl phosphate dispersion, then there is a pick-up of the dispersion by the yarn and some degree of penetration of the yarn takes place dependent upon such features as yarn temperature, the degree of twist and the nature of the yarn material. If such a treated yarn is exposed to a high temperature, of the order of 150–160° C., then the polyvinyl chloride dispersion is gelled on the yarn and encases the yarn within a sort of rubbery sheath. On the other hand, if a warp is made and dipped before weaving, then the effect obtained is markedly different. Although the polyvinyl chloride dispersion possibly gels in a subsequent high temperature treatment it appears during the interim period before gelling to be soaked in the yarn and perhaps to show some separation of the polyvinyl chloride from the plasticiser by a migratory or absorption effect into the yarn texture. Whatever the nature of the change that occurs the result is that instead of obtaining a yarn encased within a rubbery sheath a rather greasy finish is obtained and there is little evidence of any sheath as such. In practice the binding at points of contact when the yarns are woven into a fabric is negligible. It has also been observed that if a loose coil of openly woven fabric is deposited in a trough containing polyvinyl chloride/tricresyl phosphate dispersion, then the centre becomes impregnated with a fluid which is rich in plasticiser and the surfaces become coated with a surface which is rich in polyvinyl chloride. On the other hand, when lengths of slackly woven fabric are run through a trough of polyvinyl chloride/tricresyl phosphate dispersion to become fully impregnated within 1 to 3 minutes and are then suspended before gelling, no change from a good permeation which becomes rubbery on gelling was observed up to four days suspension. Similarly, a length of the same fabric was soaked in a polyvinyl chloride/tricresyl phosphate trough and pieces removed at intervals up to four days for gelling. No separation of plasticiser was evident and a good, rubbery impregnation was obtained.

One possible and partial explanation for these observations is that the woven fabric or yarn, under appropriate conditions, acts as a filtering medium to separate the plasticiser from the polyvinyl chloride. When the woven fabric is coiled before immersion, even though loosely, presumably there is a tightening effect on the surfaces which will cause it to act as if woven more tightly. Thus, the polyvinyl chloride which is present in the dispersion as discrete particles may be filtered off to some extent and a fluid rich in plasticiser penetrate the belt. This effect may be accentuated by the limited amount of fluid between the respective coils. Similarly, when yarns are treated in bulk, it is possible that they form a similar filtering medium when closely packed under tension by deflection about processing rollers.

Whatever may be the explanation for the different results obtained when using yarns impregnated with polyvinyl chloride/tricresyl phosphate dispersion prior to weaving and multiple ply textile fabrics loosely woven and impregnated with the same dispersion after weaving in accordance with the present invention, there is a significant difference in the solidity of the respective beltings.

The present invention has been described principally with reference to polyvinyl chloride as the polyvinyl compound used for impregnation because suitable grades are available commercially, for example the commercial grade known as "Geon 121."

However, other polyvinyl compounds having the property of gelling to a solid rubbery mass without significant loss of weight or volume on heating may be employed, and in this connection a co-polymer of polyvinyl chloride with polyvinylidene chloride has been found to be suitable for impregnation in admixture with polyvinyl chloride. Polyvinyl chloride/polyvinylidene chloride co-polymer is available as a commercial grade under the name "Geon 202." This material appears to exist in the form of hard particles which are difficult to grind and they tend to sediment out more easily than the polyvinyl chloride dispersion utilised hereinbefore. Nevertheless, the polyvinyl chloride/polyvinylidene chloride co-polymer can be usefully employed in admixture with polyvinyl chloride (e. g. in a proportion of 1:5) when the tendency of the polyvinyl chloride/polyvinylidene chloride co-polymer to sediment is reduced and it does confer extra hardness on the gelled material. Thus, the expression "polyvinyl compound" as used throughout this specification is intended to embrace not only polyvinyl chloride and polyvinyl chloride/polyvinylidene chloride co-polymer but any other polyvinyl compound having physical characteristics comparable with polyvinyl chloride and notably, its ability to pass from liquid dispersion to solid phase without significant volume shrinkage when gelled by heat treatment.

By the expression "liquid suspension or dispersion" is meant a solid finely subdivided in a liquid and the desired results in accordance with this invention are obtained by using a simple dispersion of polyvinyl compound in an appropriate plasticiser. By this procedure the whole of the liquid content of the dispersion remains in the belting after gelling. If solutions or water emulsions were used there would be a loss of the solvent or water vehicle on drying.

In addition to possessing a good solid and durable structure with good flexibility, frictional and ageing properties, and excellent fastener holding properties, power transmission and conveyor belting impregnated with polyvinyl compound in accordance with the invention has the added virtues of being substantially noninflammable and of offering excellent resistance to moisture penetration.

The gelled polyvinyl sheath around each yarn in the woven structure protects the rayon or other yarns and additionally is present in such quantity in the internal belt structure as to firmly bind all warp and weft yarns together and so as to confer resistance to fraying out following edgewear or other damage to the belt.

We claim:

1. A power transmission and conveyor belt comprising a multiple ply textile fabric woven so loosely as to be wholly unsuited for belting duties per se, and in which the interstices of said textile fabric are substantially completely filled with a polyvinyl compound capable of passing from liquid dispersion to solid phase without significant volume shrinkage when gelled by heat treatment.

2. A power transmission and conveyor belt comprising a multiple ply textile fabric woven so loosely as to be wholly unsuited for belting duties per se and impregnated with a polyvinyl compound capable of passing to solid phase without shrinkage when gelled by heat treatment to the extent that when gelled the impregnant constitutes between 75 and 150% by weight of the unimpregnated belt.

3. A power transmission and conveyor belt comprising a multiple ply textile fabric woven so loosely as to be wholly unsuited for belting duties per se and impregnated with a polyvinyl compound capable of passing to solid phase without shrinkage when gelled by heat treatment to the extent that when gelled the impregnant constitutes between 80% and 100% by weight of the unimpregnated belt.

4. A power transmission and conveyor belt comprising a two ply textile fabric, woven so loosely as to be wholly unsuited for belting duties per se and impregnated with a polyvinyl compound to the extent that when gelled the impregnant constitutes between 75 and 150% by weight of the unimpregnated belt, said two ply textile fabric consisting of two sets of weft threads arranged to form said two plies and bound by sets of warp threads, hereinafter referred to as binding-and-weaving warp threads, each of which passes over a weft thread in one ply and in a first column of said weft threads and under a weft thread in an adjacent ply and in a second column of said weft threads, said second column of weft threads being separated from said first column of weft threads by one intermediate column of weft threads, and said sets of binding-and-weaving warp threads being separated from one another by sets of reinforcement warp threads, said reinforcement warp threads being disposed in oppositely woven pairs in each ply and passing alternately over and under successive pairs of weft threads in each ply.

5. A power transmission and conveyor belt comprising a three ply textile fabric, woven so loosely as to be wholly unsuited for belting duties per se and impregnated with a polyvinyl compound to the extent that when gelled the impregnant constitutes between 75 and 150% by weight of the unimpregnated belt, said three ply textile fabric consisting of three sets of weft threads arranged to form said three plies and bound by sets of warp threads, hereinafter referred to as binding-and-weaving warp threads, each of which passes over a weft thread in one ply and in a first column of said weft threads and under a weft thread in an adjacent ply and in a second column of said weft threads, said second column of weft threads being separated by one intermediate column of weft threads from the first column of weft threads, and said sets of binding-and-weaving warp threads being separated from one another by sets of reinforcement warp threads, said reinforcement warp threads being disposed in oppositely woven pairs in the centre ply only of said three ply textile fabric and passing alternately over and under successive pairs of weft threads in said ply.

6. A power transmission and conveyor belt comprising a multiple ply textile fabric woven so loosely as to be wholly unsuited for belting duties per se and impregnated with polyvinyl chloride to the extent that when gelled the polyvinyl chloride constitutes between 75 and 150% by weight of the unimpregnated belt.

7. A power transmission and conveyor belt comprising a multiple ply textile fabric woven so loosely as to be wholly unsuited for belting duties per se and impregnated with an impregnant constituting of polyvinyl chloride and polyvinyl chloride/polyvinylidene chloride co-polymer to the extent that when gelled the impregnant constitutes between 75 and 150% by weight of the unimpregnated belt.

8. A power transmission and conveyor belt comprising a multiple ply textile fabric woven so loosely as to be wholly unsuited for belting duties per se, impregnated interstitially with a polyvinyl compound to the extent that when gelled the impregnant constitutes between 75 and 150% by weight of the unimpregnated belt and having a sheathing coat of polyvinyl compound.

References Cited in the file of this patent

UNITED STATES PATENTS

| | | |
|---|---|---|
| 944,125 | Brooks | Dec. 21, 1909 |
| 1,909,468 | Hoferer | May 17, 1930 |
| 2,015,103 | Dreyfus | Sept. 24, 1935 |
| 2,157,082 | Milnes | May 2, 1939 |
| 2,213,883 | Lurie | Sept. 3, 1940 |
| 2,619,705 | Foster | Mar. 22, 1952 |

FOREIGN PATENTS

| | | |
|---|---|---|
| 499,686 | Great Britain | Jan. 27, 1939 |